(12) United States Patent
Oki et al.

(10) Patent No.: US 12,487,843 B2
(45) Date of Patent: Dec. 2, 2025

(54) DATA PROTECTION FOR CONTROL PLANES IN A VIRTUALIZED COMPUTER SYSTEM

(71) Applicant: VMware, Inc., Palo Alto, CA (US)

(72) Inventors: Brian Masao Oki, San Jose, CA (US); Mukesh Hira, Los Altos, CA (US); Konstantinos Roussos, Sunnyvale, CA (US)

(73) Assignee: VMware LLC, Palo Alto, CA (US)

( * ) Notice: Subject to any disclaimer, the term of this patent is extended or adjusted under 35 U.S.C. 154(b) by 570 days.

(21) Appl. No.: 17/559,004

(22) Filed: Dec. 22, 2021

(65) Prior Publication Data

US 2022/0197687 A1 Jun. 23, 2022

Related U.S. Application Data

(60) Provisional application No. 63/129,252, filed on Dec. 22, 2020.

(51) Int. Cl.
*G06F 3/00* (2006.01)
*G06F 9/455* (2018.01)
*G06F 9/54* (2006.01)
*G06F 11/14* (2006.01)
*H04L 41/0895* (2022.01)

(52) U.S. Cl.
CPC .......... *G06F 9/45558* (2013.01); *G06F 9/541* (2013.01); *G06F 11/1469* (2013.01); *H04L 41/0895* (2022.05); *G06F 2009/45579* (2013.01); *G06F 2009/45595* (2013.01); *G06F 2201/815* (2013.01)

(58) Field of Classification Search
CPC .......................................................... G06F 9/54

USPC ........................................................... 719/310
See application file for complete search history.

(56) References Cited

U.S. PATENT DOCUMENTS 8,572,679 B1  10/2013  Wang et al.
9,276,816 B1   3/2016  Conte et al.
(Continued)

OTHER PUBLICATIONS

Jeanna Matthews, Data Protection and Rapid Recovery From Attack With a Virtual Private File Server and Virtual Machine Appliances. (Year: 2005).*

(Continued)

*Primary Examiner* — Lechi Truong
(74) *Attorney, Agent, or Firm* — Kim & Stewart LLP (57) ABSTRACT

An example method of data protection in a virtualized computing system, the virtualized computing system including a host cluster, a virtualization management server connected, and a network manager coupled to a physical network, the host cluster having hosts and a virtualization layer executing on hardware platforms of the hosts, is described. The method includes: receiving a backup request; executing, in response to the backup request, a coupled backup of the virtualization management server and the network manager, including: creating a backup of a first database in the virtualization management server, the first database storing first configuration data for a virtual infrastructure (VI) control plane of the host cluster; creating a backup of a second database in the network manager, the second database storing second configuration data for a logical network deployed in the host cluster; and storing the coupled backup in remote storage.

20 Claims, 7 Drawing Sheets

(56) References Cited

U.S. PATENT DOCUMENTS

| | | | |
|---|---|---|---|
| 9,547,562 B1* | 1/2017 | Feathergill | G06F 11/1458 |
| 9,659,040 B1 | 5/2017 | Bellingan et al. | |
| 10,289,441 B1* | 5/2019 | Chopra | G06F 11/301 |
| 10,565,160 B1 | 2/2020 | Gorelik et al. | |
| 10,754,844 B1* | 8/2020 | Jain | G06F 16/2358 |
| 11,070,520 B2* | 7/2021 | Stabile | H04L 51/04 |
| 11,252,157 B1 | 2/2022 | Khanna et al. | |
| 11,341,104 B1* | 5/2022 | Prabhakaran | H04L 67/1097 |
| 11,860,743 B1* | 1/2024 | Willett | G06F 9/45558 |
| 2010/0011178 A1* | 1/2010 | Feathergill | G06F 11/1466 |
| | | | 711/E12.103 |
| 2012/0078855 A1* | 3/2012 | Beatty | G06F 11/1451 |
| | | | 707/E17.007 |
| 2015/0071110 A1 | 3/2015 | Kothari et al. | |
| 2015/0103692 A1 | 4/2015 | Jain et al. | |
| 2015/0280928 A1* | 10/2015 | Tessmer | H04L 12/18 |
| | | | 370/390 |
| 2016/0043905 A1 | 2/2016 | Fiedler | |
| 2016/0179635 A1* | 6/2016 | Kondalsamy | G06F 11/2043 |
| | | | 714/4.12 |
| 2016/0224363 A1 | 8/2016 | Joy | |
| 2016/0254956 A1 | 9/2016 | Xu et al. | |
| 2017/0244611 A1 | 8/2017 | Wang | |
| 2018/0006902 A1* | 1/2018 | Bansal | G06F 11/3457 |
| 2018/0034747 A1 | 2/2018 | Nataraja et al. | |
| 2018/0101395 A1 | 4/2018 | Aleksandrov et al. | |
| 2018/0123932 A1 | 5/2018 | Shaw et al. | |
| 2018/0159781 A1 | 6/2018 | Mehta et al. | |
| 2018/0165122 A1 | 6/2018 | Dobrev | |
| 2018/0260251 A1* | 9/2018 | Beveridge | H04L 47/783 |
| 2018/0287938 A1* | 10/2018 | Han | H04L 61/2517 |
| 2018/0373961 A1* | 12/2018 | Wang | H04L 41/0893 |
| 2019/0020662 A1* | 1/2019 | Kumar | H04L 63/12 |
| 2019/0028342 A1 | 1/2019 | Kommula et al. | |
| 2019/0028345 A1 | 1/2019 | Kommula et al. | |
| 2019/0036868 A1 | 1/2019 | Chandrashekhar et al. | |
| 2019/0068622 A1* | 2/2019 | Lin | H04L 63/1441 |
| 2019/0102411 A1* | 4/2019 | Hung | G06N 5/025 |
| 2019/0132197 A1 | 5/2019 | Saxena et al. | |
| 2019/0171435 A1 | 6/2019 | Pande et al. | |
| 2019/0229987 A1 | 7/2019 | Shelke et al. | |
| 2019/0317751 A1 | 10/2019 | Ramsay et al. | |
| 2020/0019468 A1 | 1/2020 | Chinnam et al. | |
| 2020/0174845 A1 | 6/2020 | Toeroe | |
| 2020/0213227 A1 | 7/2020 | Pianigiani et al. | |
| 2021/0011781 A1* | 1/2021 | Wan | H04L 12/4633 |
| 2021/0081246 A1* | 3/2021 | Rajadurai | G06F 9/5016 |
| 2021/0089368 A1 | 3/2021 | Goosen et al. | |
| 2021/0165694 A1 | 6/2021 | Nabi et al. | |
| 2021/0311764 A1* | 10/2021 | Rosoff | G06F 9/44505 |
| 2021/0334004 A1* | 10/2021 | Krivenok | H04L 12/4641 |
| 2021/0334178 A1 | 10/2021 | Yang et al. | |
| 2022/0004417 A1 | 1/2022 | Sinha et al. | |
| 2022/0179760 A1* | 6/2022 | Manjunath | G06F 11/008 |

OTHER PUBLICATIONS

Zhe Wang, A Remote Backup Approach for Virtual Machine Images. (Year: 2016).*

Oussama Soualah, Reliable embedding of virtual networks in Cloud's backbone network. (Year: 2015).*

Teemu Koponen, Network Virtualization in Multi-tenant Datacenters. (Year: 2014).*

ESXSI: "vSphere 7 with Kubernetes and Tanzu on VMware Cloud Foundation," Mar. 10, 2020, ESXSI.com, Publication [online], Mar. 10, 2020 [retrieved Jul. 20, 2021], pp. 1-23. Retrieved from the Internet: <URL: https://esxsi.com/tag/kubernetes/>.

VMWARE, Inc. (Ramachandra et al.) "vCloud NFV Reference Architecture," VMware vCloud NFV 3.0, Dec. 31, 2018, Publication [online], 2018 [retrieved May 31, 2021], pp. 8-9, 15-18, 27-43, 52-75. Retrieved from the Internet: <URL: https://docs.vmware.com/en/VMware-vCloud-NFV/3.0/vmware-vcloud-nfv-30.pdf>.

International Search Report and Written Opinion mailed Jul. 1, 2021 in corresponding International Application No. PCT/US2021/024412, 9 pages.

Final Office Action mailed Aug. 26, 2022 in U.S. Appl. No. 16/838,573, 25 pages.

Lee, Keith "PKS NSX-T Home Lab—Part 8: Configure NSX-T," Nov. 24, 2018, 20 pages, URL: keithlee.ie/2018/11/24/pks-nsx-t-home-lab-part-8-configure-nsx-t/.

Shaik, Chand B. "Prepare ESXi host as fabric Node in NSX-T," Jun. 22, 2018, 8 pages, URL: virtualbrigade.com/prepare-esxi-host-as-fabric-node/.

Smit, Martijn and Omkar Singh "VMware NSX-V Control and Management Plane Connections Diagram," Aug. 21, 2018, 3 pages, URL: lostdomain.org/2018/08/21/vmware-nsx-v-control-and-management-plane-connections-diagram/.

Non-Final Office Action mailed Aug. 11, 2023 in U.S. Appl. No. 17/005,487, 14 pages.

Benson, T. et al. "CloudNaaS: A Cloud Networking Platform for Enterprise Applications," Proceedings of the 2nd ACM Symposium on Cloud Computing (SOCC'11), Oct. 27-28, 2011, 13 pages.

Lee, B. "VMware vSphere management cluster role and benefits," 2019, 5 pages, Retrieved from: www.vembu.com/blog/vmware-management-cluster-design-and-benefits/.

VMWARE, Inc. "NSX Upgrade Guide," Online Product Documentation for VMware NSX Data Center for vSphere ver.6.4; selected sections, Front page: docs.vmware.com/en/VMware-NSX-Data-Center-for-vSphere/6.4/com.vmware.nsx.upgrade.doc/GUID-4613AC10-BC73-4404-AF80-26E924EF5FE0.html (Year: 2019), 7 pages.

VMWARE, Inc. "NSX-T Data Center Upgrade Guide," VMware NSX-T Data Center 3.0, Apr. 7, 2020, 49 pages.

Non-Final Office Action mailed Jul. 14, 2022 in U.S. Appl. No. 17/005,487, 20 pages.

Awati, R. et al. TechTarget Definitions for "plane (in networking)" and "control plane (CP)," techtarget.com, 2022, 5 pages.

IBM "Get Control of Your Cloud with IBM Cloud Orchestrator and Juniper Networks Contrail," IBM Redbooks, Document identifier: REDP-5125-00, 2014, 11 pages.

Gharbaoui, M. et al. "An Orchestrator of Network and Cloud Resources for Dynamic Provisioning of Mobile Virtual Network Functions," IEEE 2016, pp. 98-101.

Martini, B. et al. "Cross-Functional Resource Orchestration in Optical Telco Clouds," ICTON 2015, 5 pages.

Oliveira, C. et al. "VMware NSX® Automation Fundamentals," VMware Press, 2018, 166 pages.

Final Office Action mailed May 3, 2024 in U.S. Appl. No. 17/005,487, 18 pages.

Pivotal Software, Inc. "Pivotal Container Service (PKS)," Version 1.3, Product Documentation, Jul. 17, 2019, 515 pages.

Thurgood, B. et al. "Cloud Computing With Kubernetes Cluster Elastic Scaling," Proceedings of the 3rd International Conference on Future Networks and Distributed Systems, Jul. 1, 2019, pp. 1-7.

Non-Final Office Action mailed Aug. 28, 2024 in U.S. Appl. No. 17/559,019, 41 pages.

Notice of Allowance mailed Oct. 9, 2024 in U.S. Appl. No. 17/005,487, 25 pages.

* cited by examiner

DATA PROTECTION FOR CONTROL PLANES IN A VIRTUALIZED COMPUTER SYSTEM

CROSS-REFERENCE TO RELATED APPLICATIONS

This application claims priority to U.S. Provisional Patent Application Ser. No. 63/129,252, filed Dec. 22, 2020, which is incorporated by reference herein in its entirety.

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. Each host includes a virtualization layer (e.g., a hypervisor) that provides a software abstraction of a physical server (e.g., central processing unit (CPU), random access memory (RAM), storage, network interface card (NIC), etc.) to the VMs. The virtualization management server sits on top of the server virtualization layer of the SDDC, which treats host clusters as pools of compute capacity for use by applications.

An SDDC can also include a separate logical network layer that manages a large portion of software-defined networking ("SD networking") across the host clusters. The logical network layer treats the physical network as a pool of transport capacity that can be consumed and repurposed on demand. While the server virtualization layer deploys and manages Layer-2 (L2) and Layer-3 (L3) SD network infrastructure, the logical network layer provides a software abstraction of complete Layer-2 to Layer-7 (L2-L7) network services ("logical network services"), such as switching, routing, access control, firewalling, Quality of Service (QoS), load balancing, and the like. A network management server sits on top of the logical network layer to manage and control the logical network services. A network administrator ("network admin") interacts with the network management server to add, configure, reconfigure, remove, etc. logical network services across the host clusters.

Backing up and restoring the configuration of the SDDC, including the states of various control planes, can be problematic. Typically, each control plane includes its own backup logic that is accessed separately, possibly by different users. While the control planes in the SDDC may exhibit some dependence on one another, the backups thereof are taken at different times and are uncoupled. For example, a virtual infrastructure admin may perform backups of the virtual infrastructure control plane, and a network admin may perform separate uncoupled backups of the logical network control plane. When one or more control planes are restored from backup, there can be various inconsistencies between the control planes and data can be lost. It is desirable to provide for a more coordinated backup, restore, and recovery process in an SDDC.

SUMMARY

In an embodiment, a method of data protection in a virtualized computing system, the virtualized computing system including a host cluster, a virtualization management server connected, and a network manager coupled to a physical network, the host cluster having hosts and a virtualization layer executing on hardware platforms of the hosts, is described. The method includes: receiving, at the virtualization management server, a backup request; executing, at the virtualization management server in response to the backup request, a coupled backup of the virtualization management server and the network manager, including: creating a backup of a first database in the virtualization management server, the first database storing first configuration data for a virtual infrastructure (VI) control plane of the host cluster; creating a backup of a second database in the network manager, the second database storing second configuration data for a logical network deployed in the host cluster; and storing the coupled backup in storage remote from the virtualization management server and the network manager.

Further embodiments include a non-transitory computer-readable storage medium comprising instructions that cause a computer system to carry out the above methods, as well as a computer system configured to carry out the above methods.

DETAILED DESCRIPTION

Data protection for control planes in a virtualized computing system is described. In embodiments described herein, a virtualized computing system includes a software-defined datacenter (SDDC) comprising a server virtualization platform integrated with a logical network platform. The server virtualization platform includes clusters of physical servers ("hosts") referred to as "host clusters." Each host cluster includes a virtualization layer, executing on host hardware platforms of the hosts, which supports execution of virtual machines (VMs). A virtualization management server manages host clusters, the virtualization layers, and the VMs executing thereon.

In embodiments, the virtualization layer of a host cluster is integrated with an orchestration control plane, such as a Kubernetes® control plane. This integration enables the host cluster as a "supervisor cluster" that uses VMs to implement both control plane nodes having a Kubernetes control plane, and compute nodes managed by the control plane nodes. For example, Kubernetes pods are implemented as "pod VMs,"

each of which includes a kernel and container engine that supports execution of containers. In embodiments, the Kubernetes control plane of the supervisor cluster is extended to support custom objects in addition to pods, such as VM objects that are implemented using native VMs (as opposed to pod VMs). A virtualization infrastructure administrator (VI admin) can enable a host cluster as a supervisor cluster and provide its functionality to development teams.

The SDDC includes a SD network layer across the host clusters. The SD network layer includes logical network services executing on a virtualized network infrastructure. The server virtualization platform manages the virtualized network infrastructure and, in cooperation with the logical network platform, manages the logical network services deployed on the virtualized network infrastructure. A VI admin interacts with the server virtualization platform for both server virtualization and network virtualization, as opposed to multiple admins interacting with two separate platforms. In embodiments, a virtualization management server includes a network management service that cooperates with a network management server (referred to as a "network manager") of the logical network platform to manage the lifecycle of logical network services thereof. The virtualization management server provides a common interface (e.g., user interface (UI) and/or application programming interface (API)) for managing compute, network, and storage.

In embodiments, the virtualization management server also includes protection service(s) for performing backup, restore, and recovery of control planes in the virtualized computing system. The control planes can include, for example, a virtualized infrastructure (VI) control plane implemented by the virtualization management server, an orchestration control plane implemented by a supervisor cluster service and master servers in the virtualization management server, a network control plane implemented by the network manager. In embodiments, the protection service(s) execute a coupled backup process where backups are taken of the control planes at the same time or approximately the same time. The backups can be taken concurrently or in sequence one after another. When restored, a coupled backup results in the control planes being consistent with one another. In case the control planes are inconsistent with the runtime state in the host cluster, protection service(s) can perform or facilitate a recovery process to remediate any inconsistencies. These and further advantages and aspects of the disclosed techniques are described below with respect to the drawings.

Figure 1:
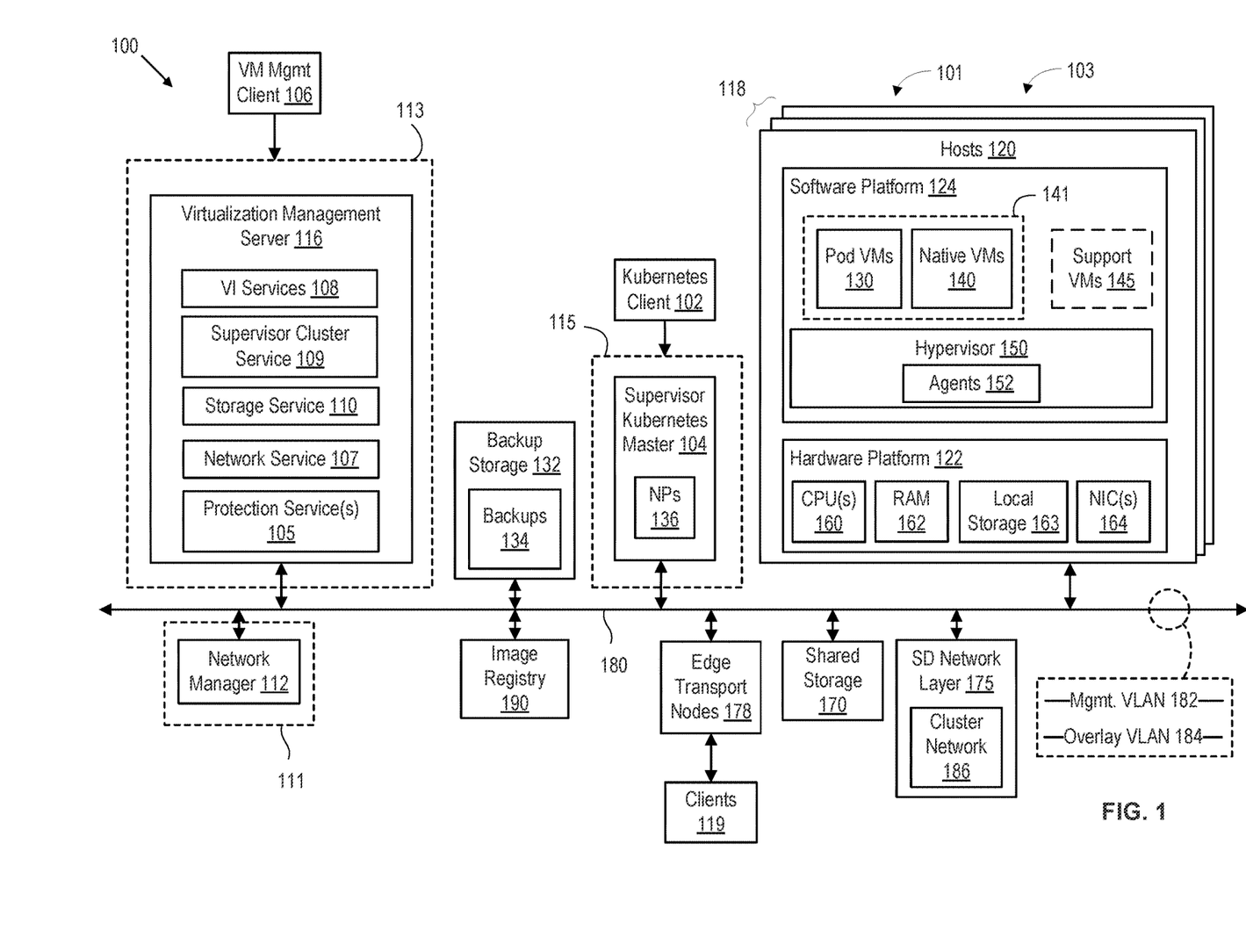
FIG. 1 is a block diagram of a clustered computer system in which embodiments may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (IOs) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks, flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN, which is another form of shared storage 170.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA.

In the example of FIG. 1, host cluster 118 is enabled as a "supervisor cluster," described further herein, and thus VMs executing on each host 120 include pod VMs 130 and native VMs 140. A pod VM 130 is a virtual machine that includes a kernel and container engine that supports execution of containers, as well as an agent (referred to as a pod VM agent) that cooperates with a controller of an orchestration control plane 115 executing in hypervisor 150 (referred to as a pod VM controller). An example of pod VM 130 is described further below with respect to FIG. 2. VMs 130/140 support applications 141 deployed onto host cluster 118, which can include containerized applications (e.g., executing in either pod VMs 130 or native VMs 140) and applications executing directly on guest operating systems (non-containerized) (e.g., executing in native VMs 140). One specific application discussed further herein is a guest cluster executing as a virtual extension of a supervisor cluster. Some VMs 130/140, shown as support VMs 145, have specific functions within host cluster 118. For example, support VMs 145 can provide control plane functions, edge transport functions, and the like. An embodiment of software platform 124 discussed further below with respect to FIG. 2.

Host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs. For example, edge transport nodes 178 can be implemented in support VMs 145 and include a gateway of SD network layer 175. Various clients 119 can access service(s) in virtualized computing system through edge transport nodes 178 (including VM management client 106 and Kubernetes client 102, which as logically shown as being separate by way of example).

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualization management server 116 further enables host cluster 118 as a supervisor cluster 101. Virtualization management server 116 installs additional agents 152 in hypervisor 150 to add host 120 to supervisor cluster 101. Supervisor cluster 101 integrates an orchestration control plane 115 with host cluster 118. In embodiments, orchestration control plane 115 includes software components that support a container orchestrator, such as Kubernetes, to deploy and manage applications on host cluster 118. By way of example, a Kubernetes container orchestrator is described herein. In supervisor cluster 101, hosts 120 become nodes of a Kubernetes cluster and pod VMs 130 executing on hosts 120 implement Kubernetes pods. Orchestration control plane 115 includes supervisor Kubernetes master 104 and agents 152 executing in virtualization layer (e.g., hypervisors 150). Supervisor Kubernetes master 104 includes control plane components of Kubernetes, as well as custom controllers, custom plugins, scheduler extender, and the like that extend Kubernetes to interface with virtualization management server 116 and the virtualization layer. In embodiments, supervisor Kubernetes master 104 includes a network plugin (NP) 136 that cooperates with network manager 112 to control and configure SD network layer 175. For purposes of clarity, supervisor Kubernetes master 104 is shown as a separate logical entity. For practical implementations, supervisor Kubernetes master 104 is implemented as one or more VM(s) 130/140 in host cluster 118. Further, although only one supervisor Kubernetes master 104 is shown, supervisor cluster 101 can include more than one supervisor Kubernetes master 104 in a logical cluster for redundancy and load balancing. Virtualized computing system 100 can include one or more supervisor Kubernetes masters 104 (also referred to as "master server(s)").

In an embodiment, virtualized computing system 100 further includes a storage service 110 that implements a storage provider in virtualized computing system 100 for container orchestrators. In embodiments, storage service 110 manages lifecycles of storage volumes (e.g., virtual disks) that back persistent volumes used by containerized applications executing in host cluster 118. A container orchestrator such as Kubernetes cooperates with storage service 110 to provide persistent storage for the deployed applications. In the embodiment of FIG. 1, supervisor Kubernetes master 104 cooperates with storage service 110 to deploy and manage persistent storage in the supervisor cluster environment. Other embodiments described below include a vanilla container orchestrator environment and a guest cluster environment. Storage service 110 can execute in virtualization management server 116 as shown or operate independently from virtualization management server 116 (e.g., as an independent physical or virtual server).

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including virtual local area network (VLAN) transport zone(s) and an overlay transport zone. A VLAN transport zone spans a set of hosts 120 (e.g., host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs) Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

In an embodiment, system 100 further includes an image registry 190. As described herein, containers of supervisor cluster 101 execute in pod VMs 130. The containers in pod VMs 130 are spun up from container images managed by image registry 190. Image registry 190 manages images and image repositories for use in supplying images for containerized applications.

Virtualization management server 116 implements a virtual infrastructure (VI) control plane 113 of virtualized computing system 100. VI control plane 113 controls aspects of the virtualization layer for host cluster 118 (e.g., hypervisor 150). Network manager 112 implements a network control plane 111 of virtualized computing system 100. Network control plane 111 controls aspects SD network layer 175.

Virtualization management server 116 can include a supervisor cluster service 109, storage service 110, network service 107, protection service(s) 105, and VI services 108. Supervisor cluster service 109 enables host cluster 118 as supervisor cluster 101 and deploys the components of orchestration control plane 115. VI services 108 include various virtualization management services, such as a distributed resource scheduler (DRS), high-availability (HA) service, single sign-on (SSO) service, virtualization management daemon, and the like. DRS is configured to aggregate the resources of host cluster 118 to provide resource pools and enforce resource allocation policies. DRS also provides resource management in the form of load balancing, power management, VM placement, and the like. HA service is configured to pool VMs and hosts into a monitored cluster and, in the event of a failure, restart VMs on alternate hosts in the cluster. A single host is elected as a master, which communicates with the HA service and monitors the state of protected VMs on subordinate hosts. The HA service uses admission control to ensure enough resources are reserved in the cluster for VM recovery when a host fails. SSO service comprises security token service, administration server, directory service, identity management service, and the like configured to implement an SSO platform for authenticating users. The virtualization management daemon is configured to manage objects, such as data centers, clusters, hosts, VMs, resource pools, datastores, and the like. Network service 107 is configured to interface an API of network manager 112. Virtualization management server 116 communicates with network manager 112 through network service 107.

Protection service(s) 105 include one or more services that provide data protection, including backup, restore, and recovery. Protection service(s) 105 are configured create a coupled backup of the control planes in the system, including the VI control plane 113, network control plane 111, and orchestration control plane 115. Protection service(s) 105 are further configured to perform a restore and recovery of the coupled backup, which can be either a coupled-restore/recovery or decoupled restore/recovery. A coupled restore/recovery includes a complete restoration of the coupled backup followed by a recovery to adjust the control planes to be consistent with the runtime state of host cluster 118. A decoupled restore/recovery includes a partial restoration of less than all control planes in the coupled backup followed by a recovery to adjust the control planes to be consistent with the runtime state of host cluster 118. Protection service(s) 105 create coupled backups 134, which are stored in backup storage 132. Backup storage 132 is remote from virtualization management server 116 and network manager 112. Backup storage 132 can be located in the same data center as virtualization management server 116 and network manager 112 or in a different data center, in the same physical location or in as different physical location.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, enable supervisor cluster 101, deploy and manage image registry 190, and the like.

Kubernetes client 102 represents an input interface for a user to supervisor Kubernetes master 104. Kubernetes client 102 is commonly referred to as kubectl. Through Kubernetes client 102, a user submits desired states of the Kubernetes system, e.g., as YAML documents, to supervisor Kubernetes master 104. In embodiments, the user submits the desired states within the scope of a supervisor namespace. A "supervisor namespace" is a shared abstraction between VI control plane 113 and orchestration control plane 115. Each supervisor namespace provides resource-constrained and authorization-constrained units of multi-tenancy. A supervisor namespace provides resource constraints, user-access constraints, and policies (e.g., storage policies, network policies, etc.). Resource constraints can be expressed as quotas, limits, and the like with respect to compute (CPU and memory), storage, and networking of the virtualized infrastructure (host cluster 118, shared storage 170, SD network layer 175). User-access constraints include definitions of users, roles, permissions, bindings of roles to users, and the like. Each supervisor namespace is expressed within orchestration control plane 115 using a namespace native to orchestration control plane 115 (e.g., a Kubernetes namespace or generally a "native namespace"), which allows users to deploy applications in supervisor cluster 101 within the scope of supervisor namespaces. In this manner, the user interacts with supervisor Kubernetes master 104 to deploy applications in supervisor cluster 101 within defined supervisor namespaces.

While FIG. 1 shows an example of a supervisor cluster 101, the techniques described herein do not require a supervisor cluster 101. In some embodiments, host cluster 118 is not enabled as a supervisor cluster 101. In such case, supervisor Kubernetes master 104, Kubernetes client 102, pod VMs 130, supervisor cluster service 109, and image registry 190 can be omitted. While host cluster 118 is show as being enabled as a transport node cluster 103, in other embodiments network manager 112 can be omitted. In such case, virtualization management server 116 functions to configure SD network layer 175.

Figure 2:
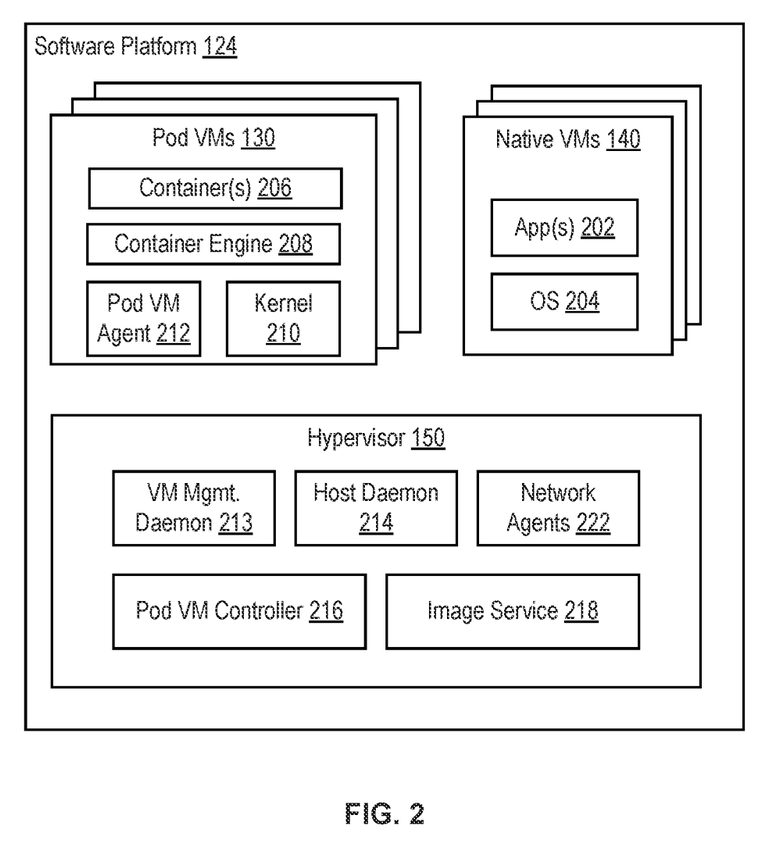
FIG. 2 is a block diagram depicting a software platform and shared storage according an embodiment.

FIG. 2 is a block diagram depicting software platform 124 according an embodiment. As described above, software platform 124 of host 120 includes hypervisor 150 that supports execution of VMs, such as pod VMs 130, native VMs 140, and support VMs 145. In an embodiment, hypervisor 150 includes a VM management daemon 213, a host daemon 214, a pod VM controller 216, an image service 218, and network agents 222. VM management daemon 213 is an agent 152 installed by virtualization management server 116. VM management daemon 213 provides an interface to host daemon 214 for virtualization management server 116. Host daemon 214 is configured to create, configure, and remove VMs (e.g., pod VMs 130 and native VMs 140).

Pod VM controller 216 is an agent 152 of orchestration control plane 115 for supervisor cluster 101 and allows supervisor Kubernetes master 104 to interact with hypervisor 150. Pod VM controller 216 configures the respective host as a node in supervisor cluster 101. Pod VM controller 216 manages the lifecycle of pod VMs 130, such as determining when to spin-up or delete a pod VM. Pod VM controller 216 also ensures that any pod dependencies, such as container images, networks, and volumes are available and correctly configured. Pod VM controller 216 is omitted if host cluster 118 is not enabled as a supervisor cluster 101.

Image service 218 is configured to pull container images from image registry 190 and store them in shared storage 170 such that the container images can be mounted by pod VMs 130. Image service 218 is also responsible for managing the storage available for container images within shared storage 170. This includes managing authentication with image registry 190, assuring providence of container images by verifying signatures, updating container images when necessary, and garbage collecting unused container images. Image service 218 communicates with pod VM controller 216 during spin-up and configuration of pod VMs 130. In some embodiments, image service 218 is part of pod VM controller 216. In embodiments, image service 218 utilizes system VMs 130/140 in support VMs 145 to fetch images, convert images to container image virtual disks, and cache container image virtual disks in shared storage 170.

Network agents 222 comprises agents 152 installed by network manager 112. Network agents 222 are configured to cooperate with network manager 112 to implement logical network services. Network agents 222 configure the respective host as a transport node in a cluster 103 of transport nodes.

Each pod VM 130 has one or more containers 206 running therein in an execution space managed by container engine 208. The lifecycle of containers 206 is managed by pod VM agent 212. Both container engine 208 and pod VM agent 212 execute on top of a kernel 210 (e.g., a Linux® kernel). Each native VM 140 has applications 202 running therein on top of an OS 204. Native VMs 140 do not include pod VM agents and are isolated from pod VM controller 216. Container engine 208 can be an industry-standard container engine, such as libcontainer, runc, or containerd. Pod VMs 130, pod VM controller 216, and image service 218 are omitted if host cluster 118 is not enabled as a supervisor cluster 101.

Figure 3:
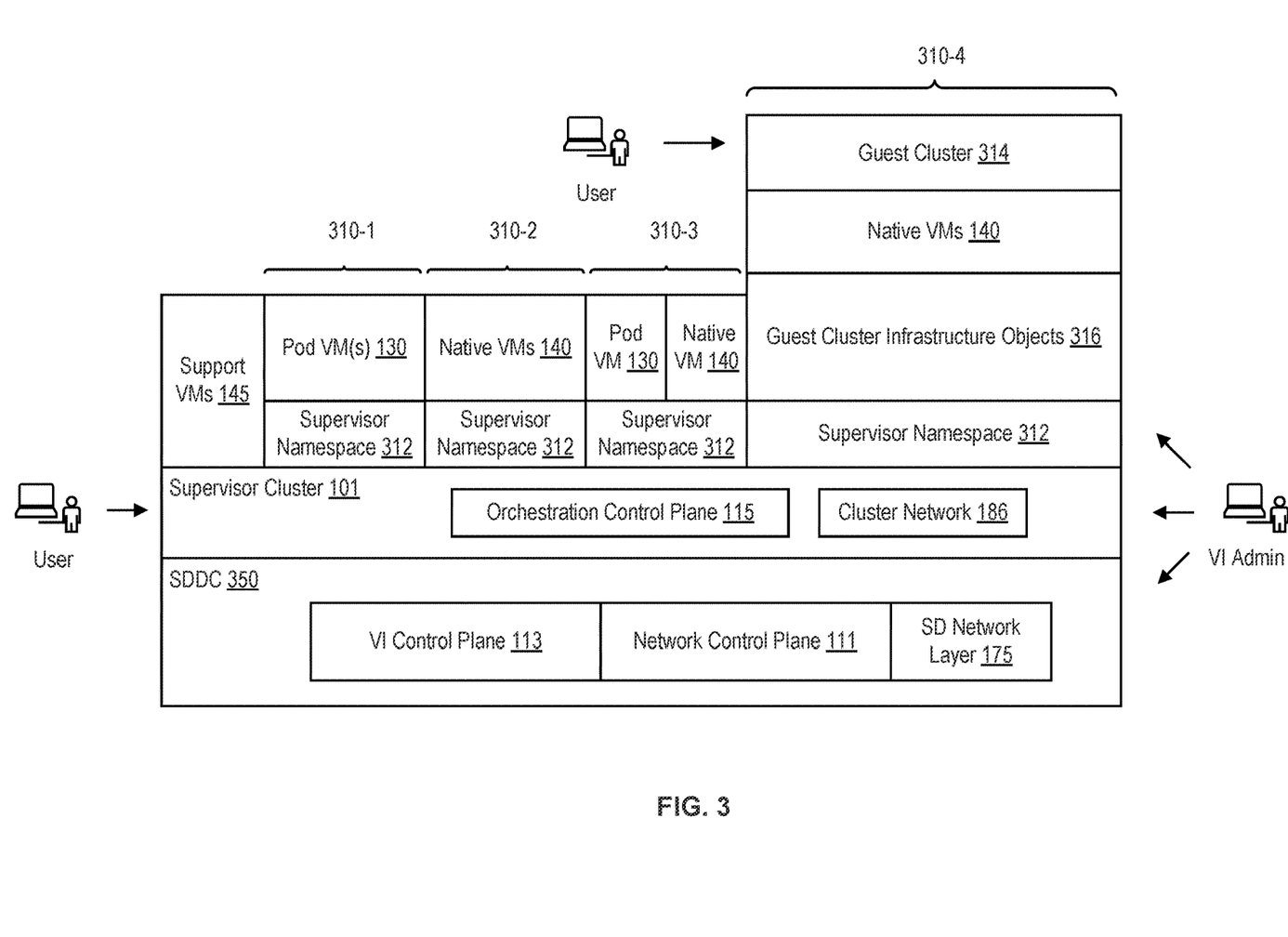
FIG. 3 is a block diagram depicting a logical view of a virtualized computing system having applications executing therein according to an embodiment.

FIG. 3 is a block diagram depicting a logical view of virtualized computing system 100 having applications executing therein according to an embodiment. In the embodiment, supervisor cluster 101 is implemented by an SDDC 350. SDDC 350 includes VI control plane 113 and network control plane 111. VI control plane 113 comprises virtualization management server 116 and associated components in the virtualization layer (e.g., control plane/data plane agents) that controls host clusters 118 and virtualization layers (e.g., hypervisors 150). Network control plane 111 comprises network manager 112 and associated components in the virtualization layer (e.g., control plane agents and data plane agents). VI control plane 113 cooperates with network control plane 111 to orchestrate SD network layer 175. VI control plane 113 (e.g., virtualization management server 116) provides a single entity for orchestration of compute, storage, and network.

In some embodiments, a VI admin interacts with virtualization management server 116 to configure SDDC 350 to implement supervisor cluster 101 and cluster network 186 in supervisor cluster 101. Cluster network 186 includes deployed virtualized infrastructure (e.g., distributed switch, port groups, resource pools, support VMs 145) and logical network services implemented thereon (e.g., logical switching, logical routing, etc.).

Supervisor cluster 101 includes orchestration control plane 115, which includes supervisor Kubernetes master(s) 104 and pod VM controllers 216. The VI admin interacts with Virtualization management server 116 to create supervisor namespaces 312. Each supervisor namespace 312 includes a resource pool and authorization constraints. The resource pool includes various resource constraints on supervisor namespace 312 (e.g., reservation, limits, and share (RLS) constraints). Authorization constraints provide for which roles are permitted to perform which operations in supervisor namespace 312 (e.g., allowing VI admin to create, manage access, allocate resources, view, and create objects; allowing DevOps to view and create objects; etc.). A user interacts with supervisor Kubernetes master 104 to deploy applications 310 on supervisor cluster 101 within scopes of supervisor namespaces 312. In the example, the user deploys an application 310-1 on pod VM(s) 130, an application 310-2 on native VMs 140, and application 310-3 on both a pod VM 130 and a native VM 140.

In embodiments, the user also deploys a guest cluster 314 on supervisor cluster 101 within a supervisor namespace 312 to implement a Kubernetes cluster. Guest cluster 314 is constrained by the authorization and resource policy applied by the supervisor namespace in which it is deployed. Orchestration control plane 115 includes guest cluster infrastructure software (GCIS) configured to realize guest cluster 314 as a virtual extension of supervisor cluster 101. The GCIS creates and manages guest cluster infrastructure objects 316 to provide abstract and physical representations of infrastructure supporting guest cluster 314. The GUS executes in orchestration control plane 115 (e.g., in supervisor Kubernetes master 104). A user can interact with the Kubernetes control plane in guest cluster 314 to deploy various containerized applications (an application 310-4). Applications 310 can communicate with each other or with an external network through SD network 308.

As noted above, in some embodiments, SDDC 350 is not enabled as a supervisor cluster 101. In such case, SD network 308 is generally deployed in SDDC 350 for use by the workloads executing therein. Supervisor cluster 101, orchestration control plane 115, supervisor namespaces 312, guest cluster infrastructure objects 316, guest cluster 314, and pod VMs 130 can be omitted from the logical view shown in FIG. 3. Thus, SDDC 350 can generally support execution of native VMs 140, which utilize an SD network layer 175 orchestrated by VI control plane 113 and/or network control plane 111 as described herein.

Figure 4:
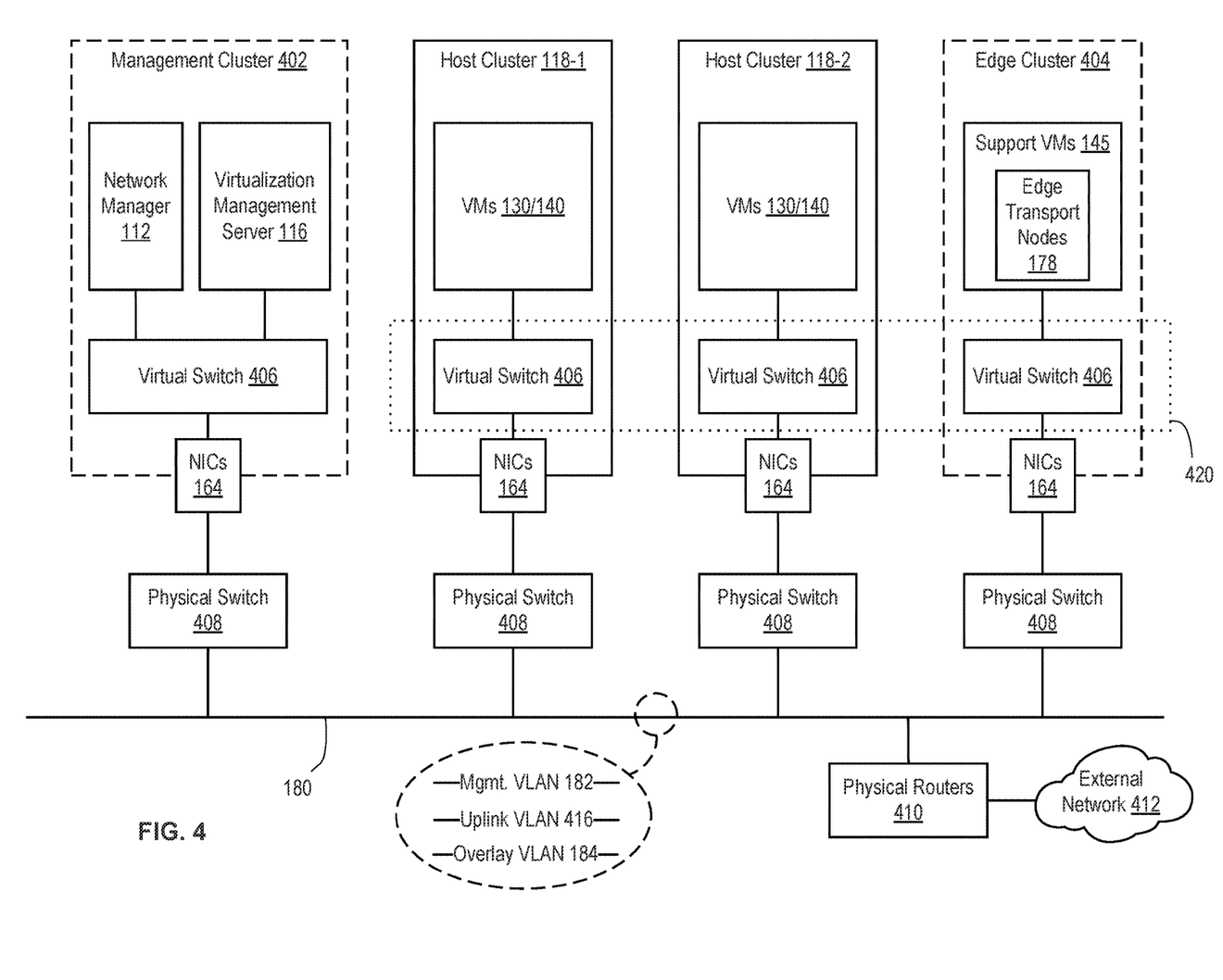
FIG. 4 is a block diagram depicting networked host clusters in a virtualized computing system according to an embodiment.

FIG. 4 is a block diagram depicting networked host clusters in virtualized computing system 100 according to an embodiment. In the example shown, virtualized computing system 100 includes two host clusters 118-1 and 118-2, each configured the same or similar as host cluster 118 shown in FIG. 1. Each host cluster 118-1 and 118-2 includes VMs 130/140 executing therein. Each VM 130/140 includes one or more virtual network interfaces to port(s) on a virtual switch 406. Virtual switch 406 includes ports coupled to NICs 164. NICs 164 are coupled to physical switches 408 on physical network 180. Physical network 180 includes one or more physical routers 410. Physical routers 410 are coupled between physical network 180 and an external network 412, such as a wide area network (WAN) (e.g., the public Internet).

In an embodiment, network manager 112 and virtualization management server 116 comprise VMs in a management cluster 402. Management cluster 402 is a logical cluster implemented within a host cluster 118. For example, management cluster 402 can be implemented within another host cluster 118 in addition to host cluster 118-1 and 118-2. In another example, management cluster 402 can be implemented within one of host cluster 118-1 or 118-2. Network manager 112 and virtualization management server 116 have virtual network interfaces coupled to ports on a virtual switch 406 same as VMs 130/140.

In an embodiment, support VMs 145 that include edge transport nodes 178 form an edge cluster 404. Edge cluster 404 is a logical cluster implemented within a host cluster 118. For example, edge cluster 404 can be implemented in another host cluster 118 in addition to host cluster 118-1 and 118-2. In another example, edge cluster 404 can be implemented within one of host cluster 118-1 or 118-2. Support VMs 145, including edge transport nodes 178, have virtual network interfaces coupled to ports on a virtual switch 406 same as VMs 130/140, network manager 112, and virtualization management server 116.

VMs 130/140 exchange data among themselves over physical network 180 within L2 networks (L2 broadcast domains) referred to herein as "segments." A virtual local area network backed (VLAN-backed) segment (also referred to as VLAN network or VLAN) is an L2 broadcast domain that is implemented as a traditional ULAN on physical network 180. In the example shown, physical network 180 includes three VLAN-backed segments: a management VLAN-backed segment (management VLAN 182); an uplink VLAN-backed segment (uplink VLAN 416); and an overlay VLAN-backed segment (overlay VLAN 184). Ports on a virtual switch 406 can be associated with a specific ULAN-backed segment of physical network 180.

For example, network manager 112, virtualization management server 116, and edge transport nodes 178 can be coupled to ports on respective virtual switches 406 that are associated with management VLAN 182. This allows communication of management traffic among network manager 112, virtualization management server 116, and edge transport nodes 178. Although not specifically shown, components in hypervisor 150 within each host 120 can be coupled to management VLAN 182 through a virtual switch 406 (e.g., control plane agents 152, pod VM controllers 216, etc.). Edge transport nodes 178 can also be coupled to ports on virtual switch 406 associated with uplink VLAN 416. Traffic on uplink VLAN 416 is routable to external network 412 via physical routers 410. Uplink VLAN 416 carries north-south traffic between host clusters 118 and external network 412.

VMs 130/140 and edge transport nodes 178 can be coupled to ports on respective virtual switches 406 associated with overlay VLAN 184. Overlay VLAN 184 carries east-west traffic between VMs 130/140. Overlay VLAN 184 supports overlay-backed segments or "logical segments." A logical segment is a logical L2 network between VMs using L2-over-L3 tunnels through overlay VLAN 184. Example tunneling protocols include VXLAN and Geneve. A logical segment is realized by deploying a logical switch. Overlay VLAN 184 can carry traffic associated with a plurality of different logical segments, each being a different logical network in an SD network. To support logical segments, virtual switches 406 are part of a distributed switch 420 that spans the hosts for which communication is desired. In the example, distributed switch 420 includes virtual switches 406 in each of host cluster 118-1, 118-2, and edge cluster 404. This allows VMs in host cluster 118-1 to exchange data with VMs in host cluster 118-2 through logical networks on the overlay network (overlay VLAN 184). This also allows VMs in either host cluster 118-1 or host cluster 118-2 reach external network 412 through edge transport nodes 178.

Figure 5:
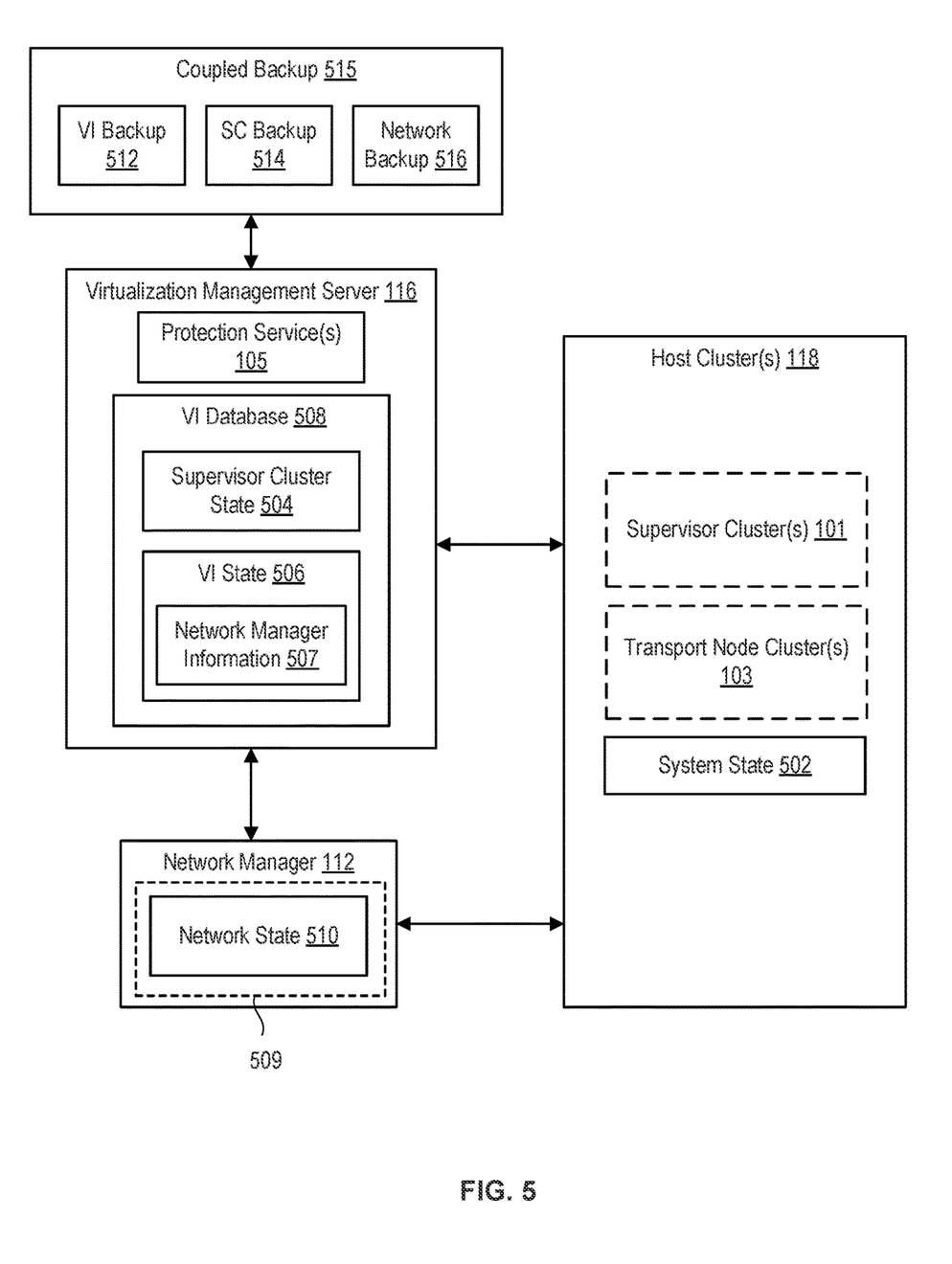
FIG. 5 is a block diagram depicting a logical view of data protection for control planes in a virtualized computing system according to embodiments.

FIG. 5 is a block diagram depicting a logical view of data protection for control planes in virtualized computing system 100 according to embodiments. Virtualization management server 116 includes a VI database 508, which stores supervisor cluster state 504, VI state 506, and network manager information 507. VI state 506 includes various configuration information for the virtualization layer in host cluster(s) 118. Supervisor cluster state 504 includes the desired state of supervisor cluster(s) 101. Network manager information 507 includes configuration information for network manager 112. Example VI state 506 includes virtualization management server name, cluster name, credential information, feature information (e.g., configuration of HA, DRS, etc.), datastore information, physical network information (e.g., Internet Protocol (IP) address, domain name, subnet mask, domain name service (DNS) servers, etc.), version information, and the like. Example supervisor cluster state 504 includes network data (e.g., IP addresses/ranges for pods/services, management network information, cluster network information), master server configuration, and the like. Example network manager information 507 includes installation information for network manager 112, transport node information, edge node configuration, and the like.

Network manager 112 includes a database 509 that stores network state 510. Network state 510 includes various configuration information for SD network layer 175, some of which can be the same or similar to network manager information 507. Host cluster(s) 118 can include one or more supervisor cluster(s) 101 and transport node cluster(s) 103. Host cluster(s) 118 include a system state 502, which is the runtime state thereof. Protection service(s) 105 generate coupled backup 515 during a requested backup operation, which includes VI backup 512, supervisor cluster (SC) backup 514, and network backup 516. VI backup 512 includes a copy of VI state 506. SC backup 514 includes a copy of supervisor cluster state 504. Network backup 516 includes a copy of network state 510. Protection services 105 executes a coupled-backup process by generating the backups 512, 514, and 516 at approximately the same time either in sequence one after another and/or concurrently. Protection service(s) 105 can generate multiple coupled backups 515 over time (e.g., either on a schedule or upon request by a user).

The data protection problem for control planes in the virtualized computing system can be stated as follows. First, VI state 506 is an approximation of the truth. The real truth, the desired VI state, is present in hosts 120 as part of system state 502. For virtualization management server 116, when VI database 508 has become corrupted or VI state 506 is otherwise unrecoverable or VI backup 512 is old, then the running state of hosts 120 is the truth. If hosts 120 are compromised and system state 502 is lost, then VI backup 512 is the only source of truth for virtualization management server 116 even if its state is stale.

Second, for network manager 112, network backup 516 is the truth, not the running state of hosts 120. Network backup 516 includes the state of all transport zones, transport nodes, and edge transport nodes. Any in-memory runtime state can be reconstructed after restoration of network backup 516. Suppose network backup 516 is taken, and then two edge nodes are removed. Suppose further the network manager 112 is destroyed. Protection service(s) 105 can spawn a new network manager 112 restored from network backup 516. This new network manager 112 thinks the two edge nodes are still in force and differs from the actual state. In some cases, a network admin can perform manual remediation to change the actual state to conform with the desired state specified in network backup 516. In other cases, protection service(s) 105 can attempt automatic remediation using additional state information stored as network manager information 507.

Third, for a supervisor cluster 101, SC backup 514 is the truth or desired state. This state consists of the supervisor cluster service configuration and data: namespaces, role bindings, storage policies, pod VM controller configuration, and so on. In embodiments, supervisor cluster state 504 is stored in VI database 508 along with VI state 506. In other embodiments, supervisor cluster state 504 can be stored in a separate database.

Backups of VI state 506, supervisor cluster state 504, and network state 510, if taken at different times, are decoupled. For example, different users can perform backups of the different control planes separately at different times, or the same user can perform the backups separately at different times. The backups are then stored separately and are unconnected (decoupled) from one another. Such a decoupled backup can result in significant problems during the restore and recovery process. The state known by each backup is likely to be different and inconsistent with one another. In case of total system failure (loss of data for all three control planes), restoration of decoupled backups can result in many inconsistencies that require manual remediation by users to correct. Even without a total system failure, restoring a backup of one control plane can result in inconsistencies with the current state of other control plane(s).

Thus, according to embodiments, protection service(s) 105 execute a coupled backup process to generate coupled backup 515. In coupled backup 515, VI backup 512, SC backup 514, and network backup 516 are taken at or approximately at the same time. Thus, the backups in coupled backup 515 are consistent with one another. When couple backup 515 is restored, the state of virtualization management server 116 and network manager 112 are consistent with each other. However, it is not necessarily the case that the state of restored coupled backup 515 is consistent with system state 502. Thus, in embodiments, after restoration some remediation can be performed either manually or automatically during recovery to make the restored state consistent with the system state 502.

Figure 6:
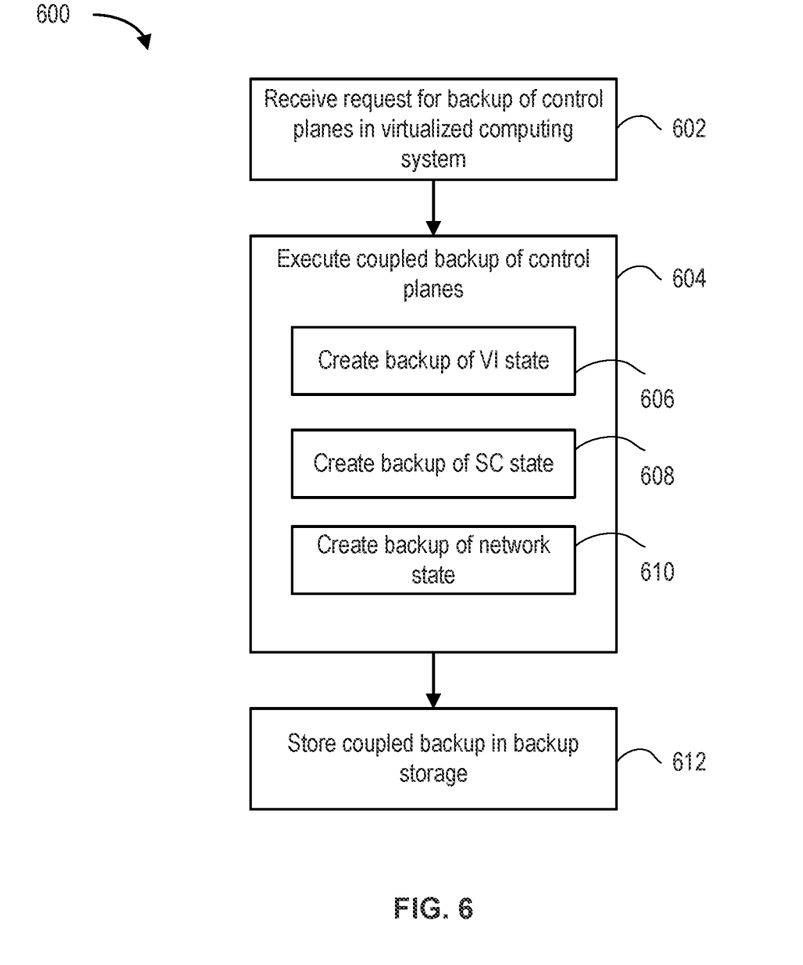
FIG. 6 is a flow diagram depicting a method of performing a backup of control planes in a virtualized computing system according to an embodiment.

FIG. 6 is a flow diagram depicting a method 600 of performing a backup of control planes in a virtualized computing system according to an embodiment. Method 600 can be performed by software in virtualization management server 116 executing on CPU, memory, storage, and network resources managed by virtualization layer(s) (e.g., hypervisor(s)) or a host operating system(s)). Method 600 can be understood with reference to FIG. 5.

Method 600 begins at step 602, where protection service(s) 105 receive a request for backup of the control planes in virtualized computing system (e.g., VI control plane 113, orchestration control plane 115, and network control plane 111). At step 604, protection service(s) 105 execute a coupled backup of the control planes. In particular, at step 606, protection service(s) 105 create a backup of VI state 506. At step 608, protection service(s) 105 create a backup of supervisor cluster state 504. At step 610, protection service(s) 105 create a backup of network state 510. In embodiments, VI state 506 and supervisor cluster state 504 are stored in the same database (e.g., VI database 508) and thus steps 606 and 608 can be performed by the same process of backing up VI database 508. In other embodiments, VI state 506 and supervisor cluster state 504 can be stored in separate databases and backups performed by separate processes. Steps 606, 608, and 610 can be performed in sequence or concurrently. In either case, the backups are generated at the same time or approximately the same time. In embodiments, protection service(s) 105 perform a backup of network state 510 through cooperation of network service 107 executing in virtualization management server 116. Protection service(s) 105 can make calls to network service 107, which in turn calls APIs of network manager 112.

At step 612, protection service(s) 105 stores coupled backup 515 in backup storage 132. Coupled backup 515 includes VI backup 512, SC backup 514, and network backup 516 which together provide a consistent state of the respective control planes at the time of the backup operation.

In some embodiments, a backup is restored after catastrophic loss of storage and servers. Supervisor cluster service 109 uses network service 107 to cooperate with network manager 112 to configure SD network layer 175. In response, supervisor cluster service 109 stores its configuration (supervisor cluster state 504) and at least a portion of network manager state 510 (as network manager information 507) in VI database 508. Under these circumstances, a backup of VI database (which includes supervisor cluster state 504) is adequate to restore the system to a state at the time of the VI database backup without having a backup of network state 510 of network manager 112. There will be no inconsistencies in the state of hypervisors 150 in hosts 120.

Figure 7:
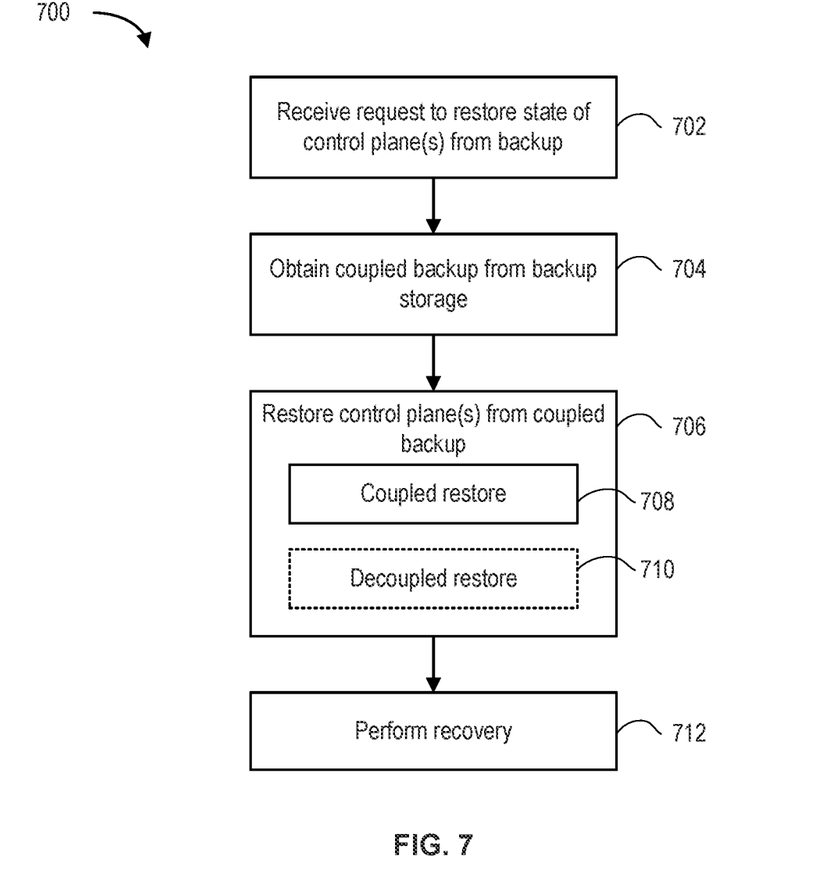
FIG. 7 is a flow diagram depicting a method of performing restore and recovery of a coupled backup according to an embodiment.

FIG. 7 is a flow diagram depicting a method 700 of performing restore and recovery of a coupled backup according to an embodiment. Method 700 can be performed by software in virtualization management server 116 executing on CPU, memory, storage, and network resources managed by virtualization layer(s) (e.g., hypervisor(s)) or a host operating system(s)). Method 600 can be understood with reference to FIG. 5.

Method 700 begins at step 702, where protection service(s) 105 receive a request to restore state of control plane(s) from a coupled backup. In some embodiments, the request includes a request to restore all of the control planes (e.g., VI control plane 113, network control plane 111, and orchestration control plane 115). In other embodiments, the request includes a request to restore less than all control planes (e.g., only the network control plane 111).

At step 704, protection service(s) 105 obtains coupled backup 515 from backup storage 132. At step 706, protection service(s) 105 restores one or more control planes per the request from coupled backup 515. In some embodiments, at step 708, protection service(s) 105 perform a coupled restore. In a coupled restore, the state of each control plane in coupled backup 515 is restored together. This results in a consistent restored state (but potentially inconsistent with system state 502). However, in cases where less than all control planes require restoration, performing a coupled restore restores state to functioning control planes. For example, if only network control plane 111 requires restoration, a coupled restore would also restore VI control plane 113 and orchestration control plane 115, which may be functioning correctly prior to the coupled restore process. This can cause those control planes, which were previously consistent with system state 502) to be restored to a prior state that is inconsistent with system state 502. Thus, in other embodiments, protection service(s) 105 perform a decoupled restore (step 710). In a decoupled restore, only the specified control planes are restored (e.g., only network control plane 111). In such case, there may be inconsistencies between the control planes that can be corrected during recovery.

At step 712, protection service(s) 105 perform recovery. In embodiments, recovery is performed manually by an admin. In other embodiments, protection service(s) 105 can perform recovery automatically. In still other embodiments, a combination of manual and automatic recovery can be performed. Recovery brings the state of the control planes to be consistent with system state 502. For manual recovery, an admin accesses system state 502 and modifies the appropriate control plane state and/or system state to become consistent. For automatic recovery, protection service(s) 105 access system state 502 and attempt to remediate inconsistencies by modifying appropriate control plane state and/or system state 502.

The embodiments described herein may employ various computer-implemented operations involving data stored in computer systems. For example, these operations may require physical manipulation of physical quantities. Usually, though not necessarily, these quantities may take the form of electrical or magnetic signals, where the quantities or representations of the quantities can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of data protection in a virtualized computing system, the virtualized computing system including a host cluster, a virtualization management server, and a network manager each coupled to a physical network, the host cluster having hosts and a virtualization layer executing on hardware platforms of the hosts, the method comprising:

receiving, at the virtualization management server, a backup request, the virtualization management server managing the host cluster, the virtualization layer, and virtual machines (VMs) executing on the virtualization layer, the virtualization management server including a service configured to cooperate with the network manager;

installing, by the virtualization management server, first agents in hypervisors of the virtualization layer to add the hosts as managed entities;

installing, by the network manager, second agents in the hypervisors of the virtualization layer to add the hosts as nodes of a logical network overlaid on the physical network, the logical network including edge nodes, managed by the network manager, configured to provide ingress and egress between the logical network and an external network;

executing, at the virtualization management server in response to the backup request, a coupled backup of the virtualization management server and the network manager, including:

creating, at a first time, a backup of a first database in the virtualization management server, the first database storing first configuration data for a virtual infrastructure (VI) control plane of the host cluster;

creating, at the first time, a backup of a second database in the network manager, the second database storing second configuration data for nodes and edge nodes of the logical network;

storing the coupled backup in storage remote from the virtualization management server and the network manager.

2. The method of claim 1, wherein the virtualized computing system includes an orchestration control plane integrated with the virtualization layer and including at least one master server managing nodes implemented as virtual machines (VMs) executing on the virtualization layer, and wherein the step of executing the coupled backup includes:

creating a backup of third configuration data for the orchestration control plane.

3. The method of claim 2, wherein the third configuration data is stored in the first database in the virtualization management server.

4. The method of claim 1, wherein the virtualization management server includes a network service configured to interface with an application programming interface (API) of the network manager, and wherein the step of creating the backup of the second database comprises requesting the backup of the second database through the network service.

5. The method of claim 1, wherein the first configuration data includes a portion of the second configuration data.

6. The method of claim 1, further comprising:
executing, by the virtualization management server, a coupled restore of the coupled backup to restore the backup of the first database to the virtualization management server and the backup of the second database to the network manager; and
executing, by the virtualization management server, a recovery to remediate one or more inconsistencies of the coupled restore based on state of the virtualization layer.

7. The method of claim 1, further comprising:
executing, by the virtualization management server, a decoupled restore of the coupled backup to restore the backup of one of the first database to the virtualization management server or the backup of the second database to the network manager; and
executing, by the virtualization management server, a recovery to remediate one or more inconsistencies of the decoupled restore based on state of the virtualization layer.

8. A non-transitory computer readable medium comprising instructions to be executed in a computing device to cause the computing device to carry out a method of data protection in a virtualized computing system, the virtualized computing system including a host cluster, a virtualization management server, and a network manager each coupled to a physical network, the host cluster having hosts and a virtualization layer executing on hardware platforms of the hosts, the method comprising:
receiving, at the virtualization management server, a backup request, the virtualization management server managing the host cluster, the virtualization layer, and virtual machines (VMs) executing on the virtualization layer, the virtualization management server including a service configured to cooperate with the network manager;
installing, by the virtualization management server, first agents in hypervisors of the virtualization layer to add the hosts as managed entities;
installing, by the network manager, second agents in the hypervisors of the virtualization layer to add the hosts as nodes of a logical network overlaid on the physical network, the logical network including edge nodes, managed by the network manager, configured to provide ingress and egress between the logical network and an external network;
executing, at the virtualization management server in response to the backup request, a coupled backup of the virtualization management server and the network manager, including:
creating, at a first time, a backup of a first database in the virtualization management server, the first database storing first configuration data for a virtual infrastructure (VI) control plane of the host cluster;
creating, at the first time, a backup of a second database in the network manager, the second database storing second configuration data for nodes and edge nodes of the logical network;
storing the coupled backup in storage remote from the virtualization management server and the network manager.

9. The non-transitory computer readable medium of claim 8, wherein the virtualized computing system includes an orchestration control plane integrated with the virtualization layer and including at least one master server managing nodes implemented as virtual machines (VMs) executing on the virtualization layer, and wherein the step of executing the coupled backup includes:
creating a backup of third configuration data for the orchestration control plane.

10. The non-transitory computer readable medium of claim 9, wherein the third configuration data is stored in the first database in the virtualization management server.

11. The non-transitory computer readable medium of claim 8, wherein the virtualization management server includes a network service configured to interface with an application programming interface (API) of the network manager, and wherein the step of creating the backup of the second database comprises requesting the backup of the second database through the network service.

12. The non-transitory computer readable medium of claim 8, wherein the first configuration data includes a portion of the second configuration data.

13. The non-transitory computer readable medium of claim 8, further comprising:
executing, by the virtualization management server, a coupled restore of the coupled backup to restore the backup of the first database to the virtualization management server and the backup of the second database to the network manager; and
executing, by the virtualization management server, a recovery to remediate one or more inconsistencies of the coupled restore based on state of the virtualization layer.

14. The non-transitory computer readable medium of claim 8, further comprising:
executing, by the virtualization management server, a decoupled restore of the coupled backup to restore the backup of one of the first database to the virtualization management server or the backup of the second database to the network manager; and
executing, by the virtualization management server, a recovery to remediate one or more inconsistencies of the decoupled restore based on state of the virtualization layer.

15. A virtualized computing system, comprising:
a host cluster, a virtualization management server, and a network manager each connected to a physical network, the virtualization management server managing the host cluster, the virtualization layer, and virtual machines (VMs) executing on the virtualization layer, the virtualization management server including a service configured to cooperate with the network manager;
the host cluster including hosts and a virtualization layer executing on hardware platforms of the hosts, the hardware platforms including central processing units (CPUs) and memories, the virtualization management server configured to install first agents in hypervisors of the virtualization layer to add the hosts as managed entities;
the network manager configured to manage a software-defined (SD) network for the host cluster, the network manager configured to install second agents in the hypervisors of the virtualization layer to add the hosts as nodes of a logical network overlaid on the physical network, the logical network including edge nodes, managed by the network manager, configured to provide ingress and egress between the logical network and an external network; and the virtualization management server configured to:
  receive a backup request;
  execute, in response to the backup request, a coupled backup of the virtualization management server and the network manager, including:
    creating a backup of a first database in the virtualization management server, the first database storing first configuration data for a virtual infrastructure (VI) control plane of the host cluster;
    creating a backup of a second database in the network manager, the second database storing second configuration data for the nodes and the edge nodes of the logical network;
  store the coupled backup in storage remote from the virtualization management server and the network manager.

16. The virtualized computing system of claim 15, wherein the virtualized computing system includes an orchestration control plane integrated with the virtualization layer and including at least one master server managing nodes implemented as virtual machines (VMs) executing on the virtualization layer, and wherein the virtualization management server executes the coupled backup by creating a backup of third configuration data for the orchestration control plane.

17. The virtualized computing system of claim 16, wherein the third configuration data is stored in the first database in the virtualization management server.

18. The virtualized computing system of claim 15, wherein the virtualization management server includes a network service configured to interface with an application programming interface (API) of the network manager, and wherein the virtualization management server creates the backup of the second database by requesting the backup of the second database through the network service.

19. The virtualized computing system of claim 15, wherein the virtualization management server is further configured to:
  execute a coupled restore of the coupled backup to restore the backup of the first database to the virtualization management server and the backup of the second database to the network manager; and
  execute a recovery to remediate one or more inconsistencies of the coupled restore based on state of the virtualization layer.

20. The virtualized computing system of claim 15, wherein the virtualization management server is further configured to:
  execute a decoupled restore of the coupled backup to restore the backup of one of the first database to the virtualization management server or the backup of the second database to the network manager; and
  execute a recovery to remediate one or more inconsistencies of the decoupled restore based on state of the virtualization layer.

* * * * *